United States Patent
McGann et al.

(10) Patent No.: US 6,920,476 B2
(45) Date of Patent: Jul. 19, 2005

(54) MESSAGING SYSTEM FOR COMPUTERS

(75) Inventors: Conor McGann, Austin, TX (US); Craig L. Dunn, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 698 days.

(21) Appl. No.: 09/800,169

(22) Filed: Mar. 5, 2001

(65) Prior Publication Data
US 2001/0047390 A1 Nov. 29, 2001

Related U.S. Application Data

(60) Provisional application No. 60/187,342, filed on Mar. 6, 2000.

(51) Int. Cl.$^7$ ................................. G06F 15/16
(52) U.S. Cl. ............... 709/201; 709/206; 709/207; 709/232; 709/234; 709/246; 379/93.24
(58) Field of Search ............... 709/201, 206, 709/207, 232, 234, 246, 224, 230; 714/13; 379/93.01, 93.15, 93.24

(56) References Cited

U.S. PATENT DOCUMENTS

| | | | | |
|---|---|---|---|---|
| 5,961,595 A | | 10/1999 | Kawagoe et al. | 709/223 |
| 6,009,462 A | | 12/1999 | Birrell et al. | 709/206 |
| 6,014,711 A | | 1/2000 | Brown | 709/245 |
| 6,023,772 A | * | 2/2000 | Fleming | 714/13 |
| 6,092,114 A | | 7/2000 | Shaffer et al. | 709/232 |
| 6,202,086 B1 | * | 3/2001 | Maruyama et al. | 709/206 |
| 6,212,552 B1 | | 4/2001 | Biliris et al. | 709/206 |
| 6,373,926 B1 | * | 4/2002 | Foladare et al. | 379/88.13 |
| 6,421,354 B1 | * | 7/2002 | Godlewski | 370/466 |
| 6,609,156 B1 | * | 8/2003 | Magolan et al. | 709/232 |
| 6,665,292 B1 | * | 12/2003 | Bradshaw et al. | 370/352 |
| 2001/0012302 A1 | * | 8/2001 | Gaffney | 370/486 |

OTHER PUBLICATIONS

PCT Written Opinion, 4 pages, Dec. 13, 2001.
PCT Search Report, Jun. 8, 2001.

* cited by examiner

Primary Examiner—Frantz B. Jean
(74) Attorney, Agent, or Firm—James E. Walton; Brian E. Harris

(57) ABSTRACT

In accordance with the present invention, a messaging system utilizes a local queue manager to receive messages intended for other processes. Messages received by the local queue manager are stored onto a local persistent storage device when a process sending the message has completed the sending action. The local queue manager then sends the message to an appropriate recipient. When the message has been received and confirmed, the recipient removes the message from the persistent storage device. If a hardware or software failure occurs, the message is stored and can be re-sent after the failure is corrected. In certain embodiments, a message writer is operable to communicate the message to the receiving process and remove the message from the queue after sending it to the receiving process. In certain embodiments, a message communicated by the sending process comprises a first format, and a message collector is operable to format the message received from the sending process into a standard format for transport to the local queue manager and storage on the persistent storage device.

21 Claims, 2 Drawing Sheets

MESSAGING SYSTEM FOR COMPUTERS

CROSS REFERENCE TO RELATED APPLICATION

This Application claims the benefit of U.S. Provisional Application No. 60/187,342 filed Mar. 6, 2000.

BACKGROUND OF THE INVENTION

1. Field of the Invention

The present invention relates generally to computer systems, and more specifically to message handling between processes and a distributed computer system.

2. Description of the Prior Art

As electronic computer systems and the processes executed on the systems become more complex, it is common to distribute processing in some manner. Further, as computing becomes more distributed over communication networks, including worldwide networks such as the internet, distributed processing becomes a desirable approach to computing.

When processing on problems becomes distributed, whether locally or remotely, communication between various processes becomes more important. These processes are sometimes referred to as modules, and must communicate with each other to perform the overall processing tasks. One common technique for communication between remotely located processes is the use of message passed between them. By using messages, it is not necessary that the processes be tightly coupled, and each process can be optimized to perform its function.

Available systems and methods for passing messages between distributed processes are not reliable enough for some applications. In certain critical applications, failure of a software or hardware module could interfere with transfer of a message between processes. If a message is lost or garbled, it may be difficult and impossible for the processes involved to accurately recover from the failure. Also, many such systems are not fast enough to ensure adequate response times as seen by users.

It would be desirable for an improved messaging system and method to reliably handle messages, and insure that messages between processes are properly routed and confirmed as received by the intended recipient process.

SUMMARY OF THE INVENTION

In accordance with the present invention, a messaging system utilizes a local queue manager to receive messages intended for other processes. Messages received by the local queue manager are stored onto a local persistent storage device, when a process sending the message has completed the sending action. The local queue manager then sends the message to an appropriate recipient. When the message has been received and confirmed, the recipient removes the message from the persistent storage device. If a hardware or software failure occurs, the message is stored and can be re-sent after the failure is corrected.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

As will be appreciated by those skilled in the art, the system described below can be implemented on nearly any system that passes messages between processes. Preferably, messages are handled asynchronously. This means that once the message is sent from the sending process, timing of receipt of the message by the receiving processes is generally not critical. In the description below, it is assumed that the sending and receiving processes are not tightly coupled, and that a message once sent need not have delivery confirmed.

Figure 1:
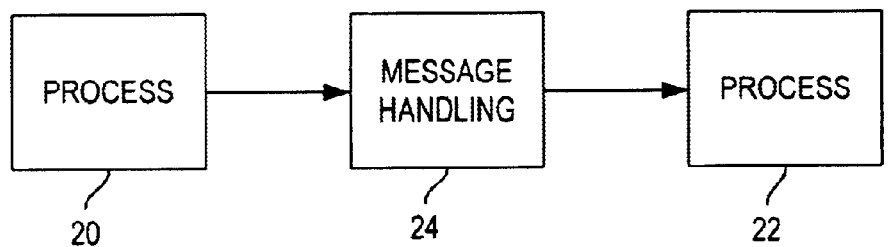
FIGS. 1 and 2 are block diagrams illustrating a messaging system in accordance with the present invention.

Referring to FIG. 1, a sending process 20 needs to send a message, as generally known in the art, to receiving process 22. This message can be, for example, a remote database access query, a status request, notification of an event occurring within sending process 20, or any other subject matter suitable for such remote messaging.

The message is sent from sending process 20 to message handling system 24, which eventually routes the message to receiving process 22. The system and method described herein are particularly applicable to the design and operation of the message handling system 24.

Figure 2:
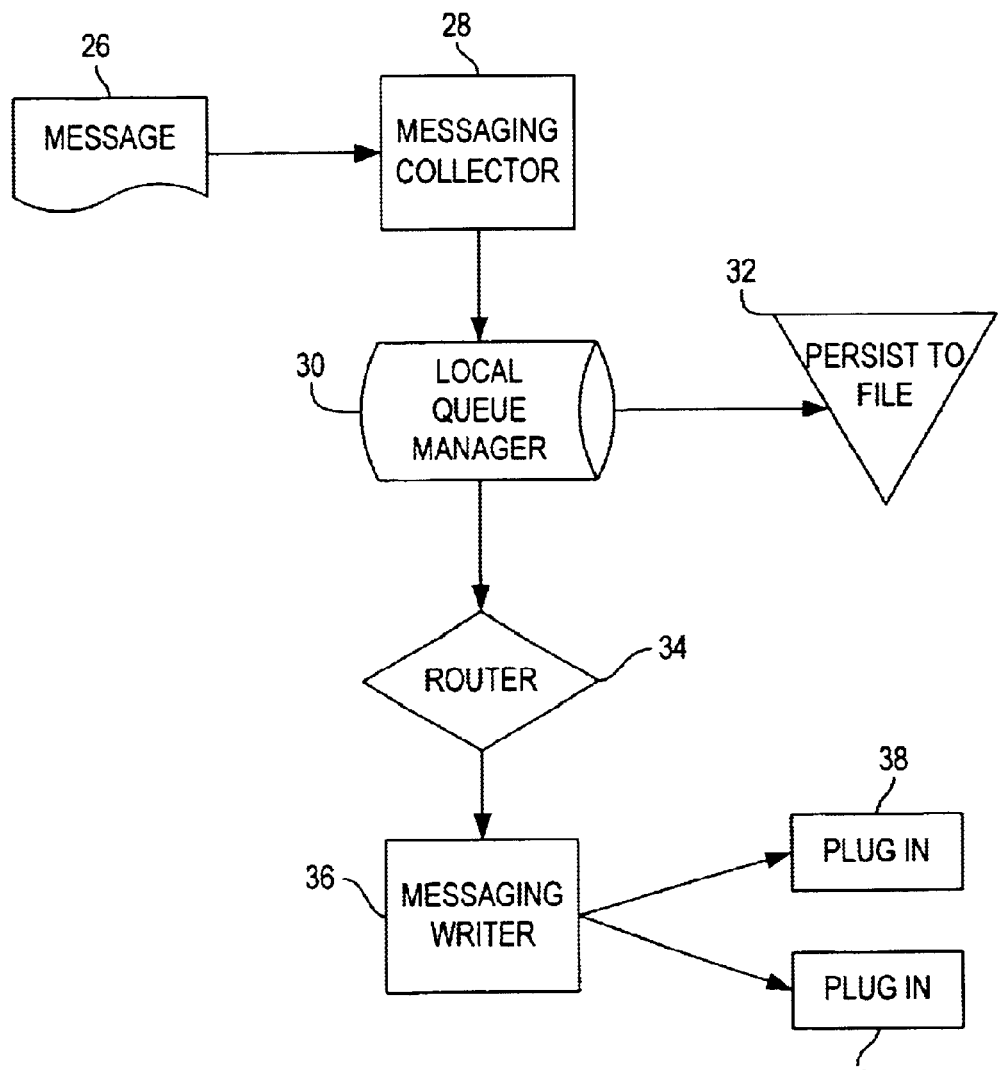

Referring to FIG. 2, message 26 is sent to messaging collector 28. Messaging collector 28 serves as the interface to the outside world for message handling system 24. Messaging handling collector 28 is preferably an object that is invoked by sending process 20 in order to handle the message to be sent. In a preferred embodiment, messaging collector 28 is invoked by a Java class call, and invokes a single method for each method passed. Those skilled in the art will recognize that messaging collector 28 may be implemented differently to perform the same functions as described herein.

Messaging collector 28 immediately passes the message off to local queue manager 30. Because local queue manager 30 is local to sending process 20, this happens very quickly and results in minimal latencies. Once messaging collector 28 has passed the message off to local queue manager 30, sending process 20 has completed sending message 26, and may return to other functions.

This approach causes message handling to be asynchronous as possible. From this point forward, the message handling system 24 will handle the responsibility for delivering message 26.

The messaging collector method 28 preferably returns a status code to sending process 20 indicating success or failure for accepting the message. This is based upon a similar success or failure status received from the local queue manager. Once an indication of success is returned, the sending process 20 assumes that the message will be reliably delivered Local queue manager 30 accepts messages as quickly as possible from messaging collector 28, and prepares them for continued transmission. Preferably, multiple messaging collector objects 28 communicate with local queue manager 30. Thus, local queue manager 30 can receive numerous messages from different messaging collector methods 28, which are in turn evoked by one or more sending processes. When the message is received by the main thread of local queue manager 30, the message is queued to a static internal class vector. Also, preferably, it is persisted to a local file system 32, where it is stored until the message is delivered. Until removed by the receiver, the message remains on the local file system so that it can be retrieved and resent in case of a hardware or software failure somewhere along the line. This increased tolerance of hardware and network failures occurs at a cost of slightly increased overall latency. However, for applications that need to ensure message delivery, this tradeoff is a good one.

Local queue manager 30 also includes a separate thread to manage outbound traffic. This thread pulls messages off the internal queue, preferably in FIFO order, and makes a call to a configured routing object 34. The call includes at least a message destination taken from the message itself, and router 34 returns a destination server to local queue manager 30. Once the destination server has been obtained, the message is passed by a standard messaging system to such server.

The destination server identified by router 34 can be implemented in any identifying manner compatible with the remainder messaging system. As described below, the message is passed to a messaging writer 36, the identification and location of which is stored in a registry or similar routing table. The routing algorithms utilized by router 34 can be any that are appropriate to the specific implementation, and can be easily changed at any time due to the separation between router 34 and local queue manager 30. This allows the routing algorithm to be changed or enhanced when, for example, the overall system is expanded and the messaging load increases.

Message writer 36 is a module that receives messages and routes them to a specific associated process. In the example in FIG. 2, plug in processes 38, 40 are associated with message writer 36, and receive messages from it.

Within messaging writer 36, a primary thread preferably receives incoming messages, and places them on to a background thread queue. The background thread determines the type of message and routes it to a specific queue for the associated plug in 38, 40. These queue threads then simply pass the messages to the plug ins 38, 40 for final receipt and process.

Once the message writer 36 has delivered the message, it removes the message form the local queue, where it had been placed by the local queue manager 30. Until message writer 36 has delivered the message, it remains on the persistent storage device, from where it can be accessed later if need be. Thus, in the event of a failure, the message is saved in a reliable location. Once the failure has been corrected, the message can be resent and receipt insured by plug in 38, 40, the intended recipient. This persistent storage of messages on a local file server enables recovery from failures to be performed in a simple manner, without requiring the messages to be re-generated by sending processes 20, a process which may not be possible due to the nature of the sending process.

The latency of messages handled by such system can be controlled to be acceptably small. Initially, the local latency from sending, or client, processes 20, are very small, due to the local nature of messaging collector 28 and local queue manager 30. End-to-end latency, defined as the time it takes a process to send a message to plug-in 38 or 40, depends on the detailed design of message handling system 24 and the current load the system is handling. Message handling system 24 can be increased in size if a lower end-to-end latency is required, and still function in the same manner as described above.

Figure 3:
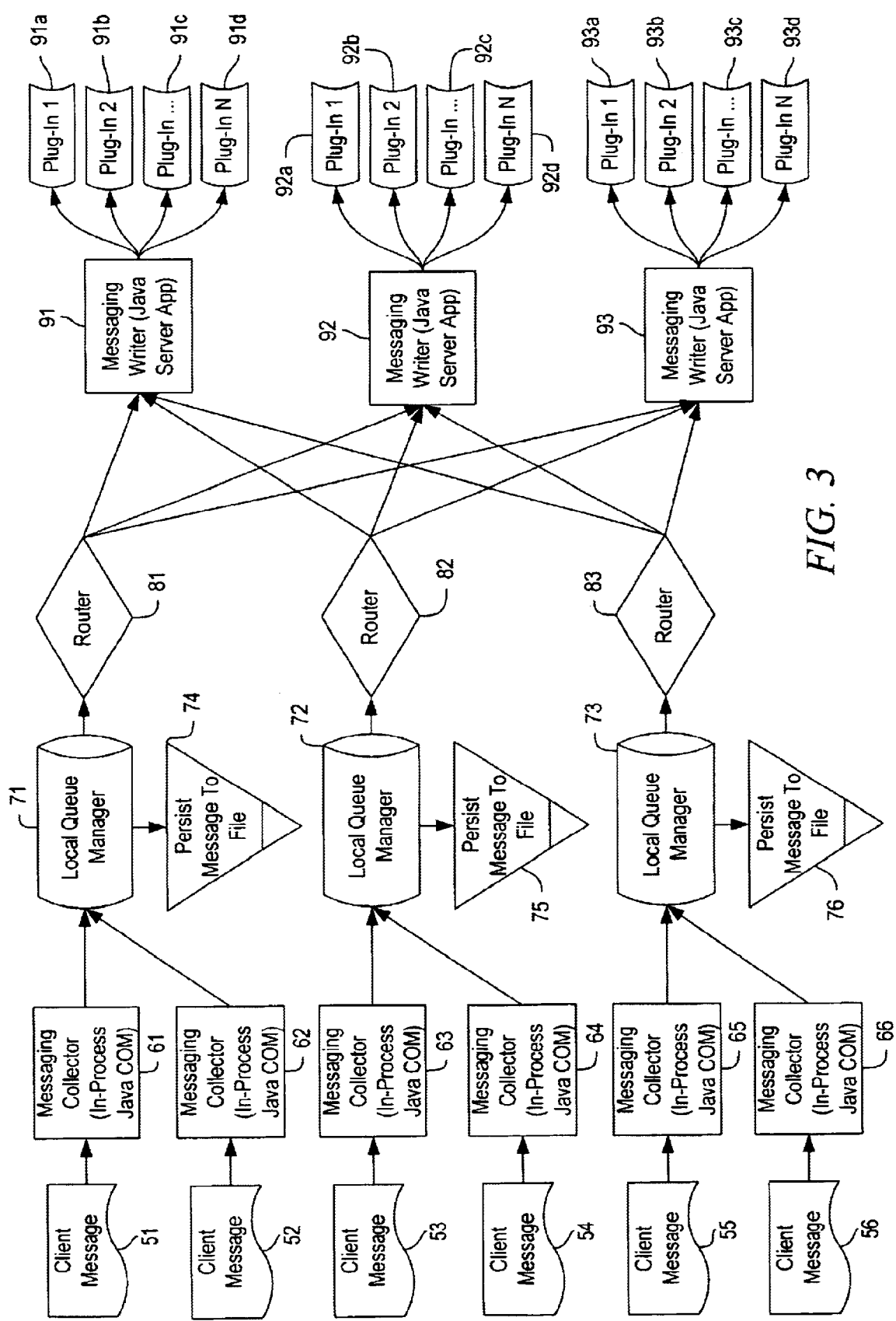
FIG. 3 is a block diagram illustrating handling of multiple messages between processes.

Referring to FIG. 3, in block diagram of a more complete message handling system 24 is illustrated. Multiple messages 51–56 are generated by multiple sending processes (not shown). Each message 51–56 is sent to its associated messaging collector 61–66. In this example, three local queue managers 71, 72, 73 are used, and each message is sent to an associated local queue manager as shown. Each local queue manager then persists, or stores in a long-term manner, each message to a local file system 74, 75, 76. Each local queue manager 71–73 invokes an associated router method 81, 82, 83, which handles routing of messages to appropriate messaging writers 91, 92, 93.

Message writers 91–93 determine the underlying type of message, and route them to an appropriate plug in as shown. As described previously, the appropriate plug in converts the message to the appropriate format, and forwards its to the receiving process 22.

As can be seen from FIG. 3, message handling system 24 is extremely fast, and can be easily extended. The message handling system is not concerned with the type of underlying message, but transfers all messages in the same way. The underlying type of the message is only a concern when the message reaches the appropriate messaging router, which sends it to the appropriate plug in for reconversion back to the original message type. All message types are treated in the same manner by the message transport system.

Additional local queue managers and messaging writers can be added at any time. As described above, routing algorithms are easily modified at any stage to perform routing that is either optimal, or good enough for the specific implementation.

The system described above is simple in operation and economical in design. It allows messages to be reliably transmitted and received, even in the event of a system failure, because the message is not marked as received by the local queue manager until it is stored onto a reliable long term storage system. Because the message remains in persistent storage until removed after receipt, it can always be re-sent after a failure.

Because the transport system does not care about the type of the underlying message, it can be used for messages of any type. The message collector 28 formats any type of message into a standard type, and it is returned to its original type in the appropriate plug in selected by the message writer 36. Thus, multiple new message types can be added to the system without impacting the message handling performed on the messages. Whenever a new message type is defined, the message collector method 28 is updated, and a new plug in is prepared to convert those messages back into their original type. No additional modifications are required.

While the invention has been particularly shown and described with reference to a preferred embodiment, it will be understood by those skilled in the art that various changes in form and detail may be made therein without departing from the spirit and scope of the invention.

What is claimed is:

1. A computer-implemented messaging system for facilitating distributed processing by reliably handling messages communicated between a sending process and one or more receiving processes, comprising:

a message collector operable to receive a message from a sending process, that is operable to generate and send the message, the message specifying a receiving process as an intended destination of the message generated by the sending process; and a local queue manager operable to:
  receive the message from the message collector;
  queue the message received from the message collector in a queue for communication to the receiving process that is the intended destination of the message; and
  store the message in a persistent storage device in communication with the local queue manager, the persistent storage device operable to reliably store the message until the message is removed by the receiving process after the message is received by the receiving process for processing;
the message received from the sending process being stored at the persistent storage device, until the receiving process removes the message from the persistent storage device after the message is received by the receiving process for processing, storing the message at the persistent storage device until the message is removed by the receiving process after being received by the receiving process enhancing reliability that the message will be successfully communicated to the receiving process.

2. The system in claim 1, further comprising a message writer in communication with the local queue manager and the receiving process, the message writer operable to communicate the message to the receiving process and to remove the message from the queue after sending it to the receiving process.

3. The system of claim 1, wherein:
  the message communicated by the sending process comprises a first format; and
  the message collector is further operable to reformat the message received from the sending process from the first format into a standard format for transport to the local queue manager and storage on the persistent storage device.

4. The system of claim 3, further comprising at least one process, associated with the receiving process, for converting the received message from the standard format to the first format.

5. The system of claim 1, wherein the message comprises one or more of:
  a remote database access query;
  a status request; and
  a notification of an event occurring within the sending process.

6. The system of claim 1, wherein the message collector comprises an object operable to be invoked by the sending process in order to handle the message sent by the sending process.

7. The system of claim 1, wherein:
  the local queue manager is operable to communicate a first success message to the message collector indicating that the message was successfully received by the local queue manager; and
  the message collector is operable to, in response to receiving the first success message from the local queue manager, communicate a second success message to the sending process indicating that the message was successfully received by the local queue manager and allowing the sending process to assume that the message will be reliably delivered to the receiving process.

8. The system of claim 1, wherein the local queue manager is further operable to:
  retrieve, if communication of the message to the receiving process fails, the message from the persistent storage device; and
  resend the message to the receiving process without requiring the sending process to regenerate the message.

9. A computer-implemented method for facilitating distributed processing by reliably handling messages communicated between a sending process and one or more receiving processes, comprising:
  receiving a message from a sending process that is operable to generate and send the message, the message specifying a receiving process as an intended destination of the message generated by the sending process;
  queuing the message in a queue for communication to the receiving process that is the intended destination of the message;
  storing the message in a persistent storage device operable to reliably store the message until the message is removed, the message being stored at the persistent storage device until the receiving process removes the message from the persistent storage device after the message is received by the receiving process for processing;
  sending the message to the receiving process for processing; and
  removing the message from the persistent storage device after the message has been received by the receiving process, storing the message at the persistent storage device until the message is removed by the receiving process after being received by the receiving process enhancing reliability that the message will be successfully communicated to the receiving process.

10. The method of claim 9, further comprising communicating the message to a message writer prior to communication of the message to the receiving process, the message writer operable to communicate the message to the receiving process and to remove the message from the queue after sending the message to the receiving process.

11. The method of claim 9, wherein:
  the message communicated by the sending process comprises a first format; and
  the method further comprises formatting the message received from the sending process from the first message format to a standard format for storage on the persistent storage device.

12. The method of claim 11, further comprising converting the message from the standard format to the first format prior to receipt of the message by the receiving process.

13. The method of claim 9, wherein the message comprises one or more of:
  a remote database access query;
  a status request; and
  a notification of an event occurring within the sending process.

14. The method of claim 9, comprising invoking an object for handling the message sent by the sending process.

15. The method of claim 9, further comprising:
  communicating a first success message to the message collector indicating that the message was successfully received by the local queue manager; and
  in response to the first success message, communicating a second success message to the sending process indicating that the message was successfully received by the local queue manager and allowing the sending process to assume that the message will be reliably delivered to the receiving process.

16. The method of claim 9, further comprising:

retrieving, if communication of the message to the receiving process fails, the message from the persistent storage device; and resending the message to the receiving process without requiring the sending process to regenerate the message.

17. Software for facilitating distributed processing by reliably handling messages communicated between a sending process and one or more receiving processes, the software being embodied in computer-readable media and when executed operable to:

receive a message from a sending process that is operable to generate and send the message, the message specifying a receiving process as an intended destination of the message generated by the sending process;

queue the message in a queue for communication to the receiving process that is the intended destination of the message;

store the message in a persistent storage device operable to reliably store the message until the message is removed, the message being stored at the persistent storage device until the receiving process removes the message from the persistent storage device after the message is received by the receiving process for processing;

send the message to the receiving process for processing; and remove the message from the persistent storage device after the message has been received by the receiving process, storing the message at the persistent storage device until the message is removed by the receiving process after being received by the receiving process enhancing reliability that the message will be successfully communicated to the receiving process.

18. The software of claim 17, further operable to communicate the message to a message writer prior to communication of the message to the receiving process, the message writer operable to communicate the message to the receiving process and remove the message from the queue after sending the message to the receiving process.

19. The software of claim 17, wherein:

the message communicated by the sending process comprises a first format; and the software is further operable to format the message received from the sending process from the first format to a standard format for storage one the persistent storage device.

20. The software of claim 19, further operable to convert the message from the standard format to the first format prior to receipt of the message by the receiving process.

21. A computer-implemented messaging system for facilitating distributed processing by reliably handling messages communicated between a sending process and one or more receiving processes, comprising:

means for receiving a message from a sending process that is operable to generate and send the message, the message specifying a receiving process as an intended destination of the message generated by the sending process;

means for queuing the message in a queue for communication to the receiving process that is the intended destination of the message;

means for storing the message in a persistent storage device operable to reliably store the message until the message is removed, the message being stored at the persistent storage device until the receiving process removes the message from the persistent storage device after the message is received by the receiving process for processing;

means for sending the message to the receiving process for processing; and means for removing the message from the persistent storage device after the message has been received by the receiving process, storing the message at the persistent storage device until the message is removed by the receiving process after being received by the receiving process enhancing reliability that the message will be successfully communicated to the receiving process.

* * * * *